April 24, 1934.  H. JUNKERS  1,956,354
STRUCTURAL ELEMENT
Filed July 15, 1930
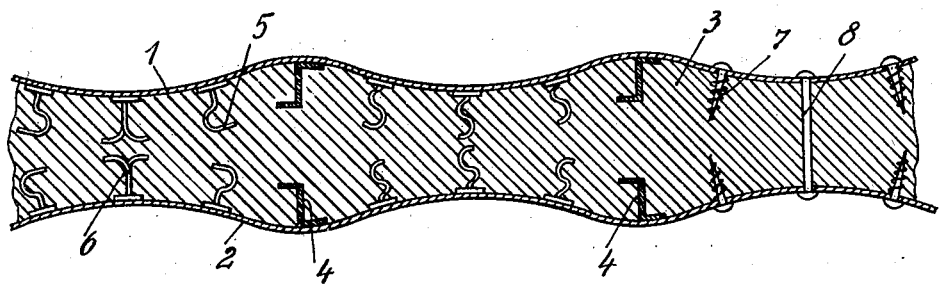
Inventor:
Hugo Junkers
by Karl Kuchacheg
Atty.

Patented Apr. 24, 1934

1,956,354

UNITED STATES PATENT OFFICE 1,956,354

STRUCTURAL ELEMENT

Hugo Junkers, Dessau, Germany

Application July 15, 1930, Serial No. 468,053
In Germany March 7, 1928

1 Claim. (Cl. 72—30)

My invention refers to structural elements adapted for use in the construction of walls, roofs, doors etc., and more especially of walls, doors and the like which consist mainly or partly of metal, as described in my copending U. S. application Ser. No. 343,646, filed March 1, 1929. In this application I have described structural elements comprising two sheet metal plates of flatly concave or flatly corrugated section with a spacer inserted between them and means for holding the plates on the spacer.

It is an object of my invention to provide an element of this general type which is so designed that a plastic filler may be cast or forced into the space between the sheet metal plates which after hardening holds the plates spaced apart. Means such as hooks, sections and the like are provided on the inner faces of the plates so that they project into the space to be occupied by the filler and when the filler has hardened hold the plate or plates firmly thereon.

Other means such as screws or stays may also be provided for preventing separation of the plates from the filler.

Corrugated sheet metal which has hitherto been mainly used for structural elements, involves the disadvantage that its resistance to bending forces is unsatisfactory except to forces acting in the direction of the corrugations. By providing a combined spacer and filler as described, I avoid these disadvantages and obtain greater rigidity and resistance to stress in all directions without making larger the cross section of the sheet metal.

When forces are exerted on the wall which act against its ends so as to generate buckling stress in the wall the filler acts as a spacer and prevents any deformation under such stress, so that I obtain a very stiff and strong wall without providing special stress-absorbing means outside the depression or corrugations.

It is particularly advantageous to provide two plates at opposite sides of the filler which are preferably symmetrical in cross section, that is, with the convex sides of their depressions, or of their corrugations, facing each other. Obviously the inner ends of the plate parts facing each other must be spaced apart for a distance corresponding to the minimum thickness of the filler.

By way of example I shall describe structural elements in which corrugated sheet metal is used but it is understood that I may also adapt my invention to sheet metal plates having a single depression only instead of corrugations.

In the drawing affixed to this specification and forming part thereof a structural element embodying my invention is illustrated diagrammatically by way of example in cross-section.

Referring now to the drawing, 1 and 2 are two corrugated sheet metal plates, and 3 is a filler or spacer of plastic hardening material which is cast or forced into the space between the two plates. Inwardly projecting members are provided on the inner faces of the plates for holding the plates in position on the filler 3. Such members may be angular sections 4, single hooks 5 or double hooks 6, the angular members 4 being preferably of Z-section.

Instead of holding members which are secured to the inner faces of the plates initially I may provide members which are inserted from the outside after the filler has hardened, for instance, screws 7, stays 8, and the like. Providing holding members only on the inner faces of the plates has the advantage of dispensing with projections on the outer faces of the members, such as the heads of screws or rivets.

Any plastic and hardening substance may be used as a filler, for instance, artificial wood, glue, resin, asphalt, metal of low melting point, mortar, and the like. Preferably a substance having low heat conductivity is selected, particularly if the element is to be used for walls of buildings or other compartments of any kind in which good heat insulation is important. An element made as described is highly resistive against stresses of all kinds and in all directions.

I wish it to be understood that I do not desire to be limited to the exact details of construction shown and described for obvious modifications will occur to a person skilled in the art.

I claim:

Structural member for use in the construction of vertical walls and the like comprising a continuous plate of originally plastic mineral material formed on both sides with shallow channel-shaped undulations of large radii whose axes extend in vertical direction, sheet metal linings closely applied to the undulated sides of said plate and a great number of fixation means connected with and distributed over the undulated portions of said linings, said fixation means extending into said plate so as to hold said linings in contact, substantially all over their undulated surfaces, with the undulated surfaces of said plate and to render said sheet metal linings resistive against stresses acting thereon in a plane extending in parallel with said mineral plate.

HUGO JUNKERS.